US006370393B1

United States Patent
Otsuka et al.

(10) Patent No.: US 6,370,393 B1
(45) Date of Patent: Apr. 9, 2002

(54) PRIVATE BRANCH EXCHANGE

(75) Inventors: Kiyokazu Otsuka; Minako Takai, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/349,228

(22) Filed: Jul. 8, 1999

(30) Foreign Application Priority Data

Jul. 13, 1998 (JP) .......................................... 10-197211

(51) Int. Cl.⁷ ................................................ H04B 1/38
(52) U.S. Cl. ....................... 455/555; 455/463; 455/554; 455/465
(58) Field of Search ................................ 455/555, 554, 455/563, 465, 426; 379/60, 61, 63, 59

(56) References Cited

U.S. PATENT DOCUMENTS

| | | | | |
|---|---|---|---|---|
| 5,440,613 A | * | 8/1995 | Fuentes ........................ | 379/60 |
| 5,479,483 A | * | 12/1995 | Furuya et al. ................. | 379/60 |
| 5,978,667 A | * | 11/1999 | Suzuki et al. ................ | 455/403 |
| 6,138,015 A | * | 10/2000 | Langmantel ................. | 455/432 |

FOREIGN PATENT DOCUMENTS

| JP | 4-70021 | 3/1992 |
|---|---|---|
| JP | H08-265829 | 10/1996 |
| JP | H10-174145 | 6/1998 |
| JP | 10-210156 | 8/1998 |

* cited by examiner

*Primary Examiner*—Daniel Hunter
*Assistant Examiner*—Lana Le
(74) *Attorney, Agent, or Firm*—Sughrue Mion, PLLC

(57) ABSTRACT

The present invention provides a private branch exchange which allows the same system call sign (SYS-ID) to be shared with other private branch exchanges for allocating it to general cell stations. The private branch exchange (PBX), to which a control cell station (CS) is allocated, communicating with mobile stations (PS) reads the system call sign from the control cell station where the system call sign is stored in advance. The system call sign is stored into cell stations in a plurality of private branch exchanges connected to each other when the cell stations belong to the same group as that of the control cell station of the first mentioned private branch exchange.

6 Claims, 1 Drawing Sheet

PRIVATE BRANCH EXCHANGE

FIELD OF THE INVENTION

The present invention relates to a private branch exchange with the Personal Handyphone System (PHS) function, and more particularly to multiple private branch exchanges which can use the same system call sign.

BACKGROUND OF THE INVENTION

A conventional private branch exchange (PBX) with the PHS function reads the system call sign (SYS-ID) from a control cell station (control CS), stores the system call sign in the PBX, and writes data to general CSs belonging to the PBX. This prevents a plurality of PBXs from setting the same SYS-ID for (or in) general cell stations (general CSs).

An earlier patent disclosure dealing with this is found in Japanese Patent Publication Kokai JP-A No. Hei 4-70021. In this patent publication, a codeless telephone system is disclosed in which a mobile station has the same ID number as that of the PBX. This system allows mobile stations of multiple PBXs, connected via a leased line and having the same ID number, to send and receive calls to establish communication.

SUMMARY OF THE DISCLOSURE

However, in the course of the investigations toward the present invention the following problems have been encountered. Namely as described above, two or more conventional private branch exchanges (PBXs), each with the PHS function, cannot assign the same SYS-ID to multiple general CSs. This means that a mobile station (PS) which moves from one PBX to another cannot connect to general CSs.

The present invention seeks to solve the problems described above. It is an object of the present invention to provide a private branch exchange which may assign the same SYS-ID to general CSs for use in a plurality of private branch exchanges.

Further objects of the present invention will become apparent in the entire disclosure.

To achieve the above object, in one aspect of branch of the present invention there is provided a private branch exchange comprising a control cell station and communicating with at least one mobile station, wherein, the private branch exchange comprises
(a) means for reading a system call sign based on group information on a group associated with an allocated location of the control cell station, said system call sign corresponding to the group from any of private branch exchanges storing the system call sign corresponding to said group, and
(b) means for storing said system call sign also in a cell station in any of a plurality of private branch exchanges which are connected with said private branch exchange, provided that the cell station belongs to the same group of said control cell station.

According to a second aspect of the present invention, there is provided a private branch exchange network system comprising a network of plurality of private branch exchanges, each comprising a control cell station and communicating with at least one mobile station, (a) in which databases of the private branch exchanges may be cross-referenced, and
(b) in which a control cell station allocated to each private branch exchange may be uniquely identified in each group with a call area number and a cell station number, (c) each of said private branch exchange comprising:
  (c1) a node unit database in which PBX identification information on said private branch exchange and group information associated with an allocated location of the control cell station are stored;
  (c2) a network common database in which the PBX identification information identifying the private branch exchange to which said control cell station is allocated is stored, said PBX identification being associated with information on the group to which said control cell station belongs and with a call area number and a cell station (CS) number of each cell station; and
  (c3) means for copying the network common database to any of other private branch exchanges at a regular interval, (d) wherein a first private branch exchange to which said control cell station is allocated:
  (i) stores a system call sign of the group to which the control cell station belongs into the node database of the first private branch exchange,
  (ii) when a general cell station allocated to a second private branch exchange is started, said system call sign is read either from the data base of a second private branch exchange to which the general cell station is allocated or from the database of a private branch exchange to which the control cell station corresponding to the group of said general cell station belongs, and
  (iii) said system call sign is stored also in any general cell station belonging to the same group of said control cell station in a plurality of the private branch exchanges connected each other.

Further aspects and features of the present invention will become apparent in the entire disclosure including the appended claims. The features of the dependent claims are incorporated herein by reference thereto.

PREFERRED EMBODIMENTS OF THE INVENTION

Figure 1:
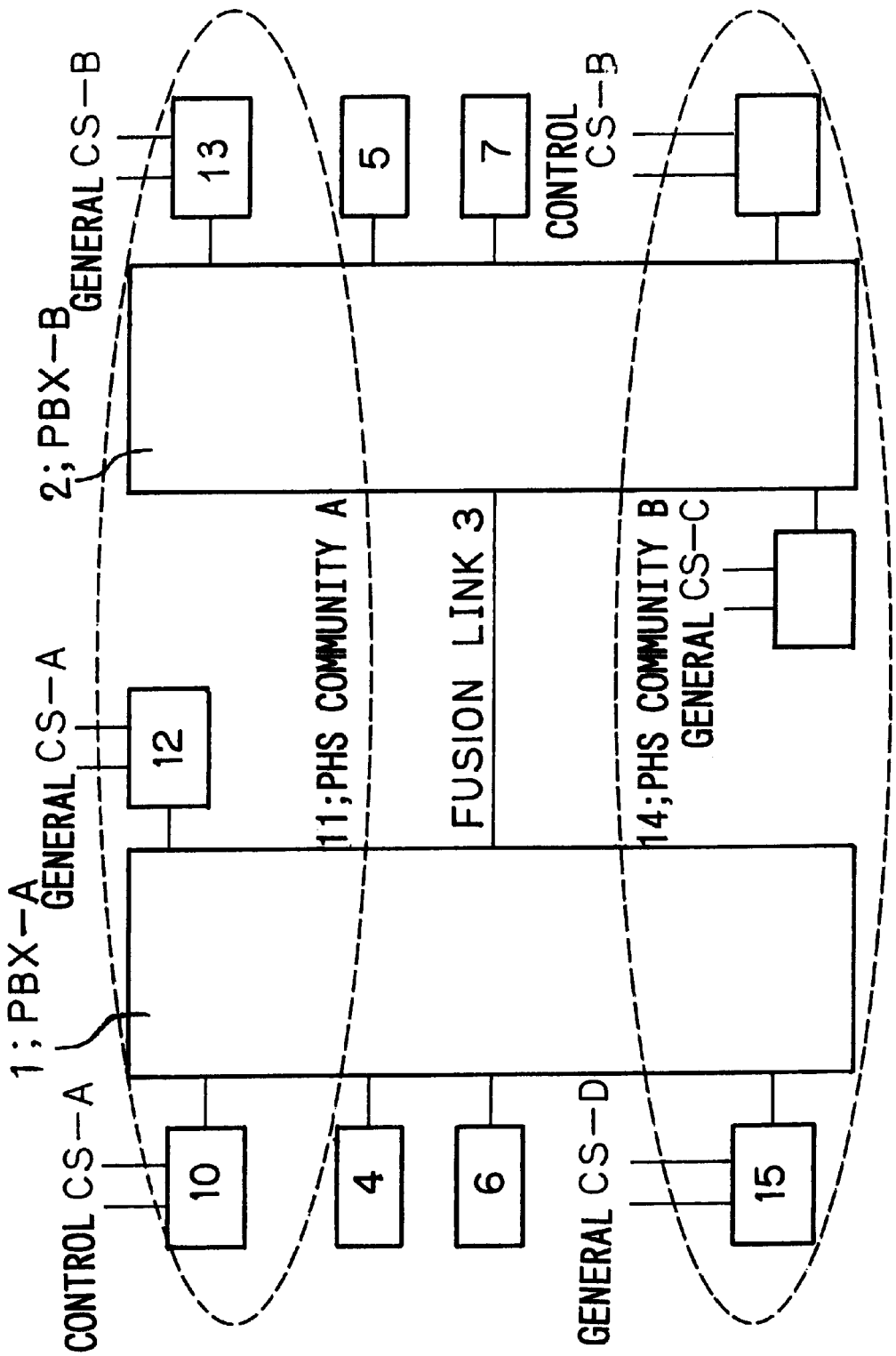
FIG. 1 is a diagram showing the configuration of an embodiment according to the present invention.

An embodiment of the present invention will now be described more in detail. In a preferred embodiment of the present invention, a SYS-ID of a PHS community associated with the location-under-control of a control cell s station (control CS) is read from the control CS that is a cell station (CS) storing the system call sign (SYS-ID). This SYS-ID is assigned to a plurality of cell stations (general CSs) belonging to the same group (called "PHS community") as that of this control CS, however, belonging to a plurality of different PBXs.

FIG. 1 is a diagram showing the configuration of an embodiment according to the present invention. Two private branch exchanges, PBX-A and PBX-B, form a network based on the distributed node exchange network call control method (For this control method, refer to Japanese Patent Application No. 09-011263, now JP-A-10-210156, corresponding U.S. patent application Ser. No. 09/013,037 filed on Jan. 26, 1998, the entire disclosure thereof being incorporated herein by reference thereto.)

Each CS may be uniquely identified in PHS community A or in PHS community B with the call area number and the CS number.

PBX-A and PBX-B, connected via a digital leased line (a fusion link), may reference their databases with each other.

The PBX identification number is stored in the node database (6 and 7) of each PBX contains so that PBX-A and PBX-B may be identified by the PBX identification number A and the PBX identification B, respectively.

The cell area number and the CS number of the control CS-A corresponding to PHS community A are stored, in advance, in a network common database (4).

The PBX identification number A, which uniquely identifies PBX-A to which the control CS-A belongs, is associated with PHS community A and with the call area number and the CS number of each CS, and is stored in network common database (4).

In addition, the PHS community number A, associated with the location-under-control of the control CS-A, is stored in the node database (6).

Copy means are provided for copying the network common database (4) of PBX-A to and from the network common database (5) of PBX-B at a regular interval.

When a general CS-B under control of PBX-B is started, PBX-B attempts to read the SYS-ID corresponding to the PHS community A from the node database (7).

When the node database (7) of PBX-B does not contain the SYS-ID of PHS community A, PBX-B searches in its own network common database (5) for the SYS-ID. If the network common database (5) contains the SYS-ID corresponding to PHS community A, PBX-B reads it.

On the other hand, if the network common database (5) of PBX-B does not contain the SYS-ID corresponding to PHS community A, PBX-B reads the call area number and the CS number of control CS-A corresponding to PHS community A from network common database (5), reads the PBX identification number A of the control CS-A, associated with PHS community A and with the call area number and the CS number of the control CS-A, from the network common database (5). Then, PBX-B attempts to read the SYS-ID associated with PHS community A from the node database (6) of PBX-A specified by this PBX identification number A. The node database stores the data for each node.

As a result of the above processing, when PBX-B gets the SYS-ID associated with PHS community A, PBX-B stores the thus obtained SYS-ID as a SYS-ID corresponding to PHS community A into the node database (7) of PBX-B.

In addition, PBX-B stores the SYS-ID, which was read, also into the general CS-B as the SYS-ID of the general CS-B.

When the control CS-A is started, PBX-A under which the control CS-A is control led (e.g., to which the control CS-A is connected) reads the PHS community number associated with the location-under-control of the control CS-A from the node database (6), determines that this is the number of the PHS community A, and, after determining that this is associated with PHS community A, writes the SYS-ID in association with the PHS community A into the its own node database (6).

Via a maintenance terminal in PBX-A, the SYS-ID is copied from the node database (6) to the network common database (4) upon necessity.

EXAMPLE

An embodiment of this invention will now be described more in detail with reference to the drawings. FIG. 1 is a diagram showing the system configuration of the embodiment according to the present invention. Referring to FIG. 1, a CS that is under control of (e.g., connected to) each PBX has a unique ID within a distributed node exchange network where the system of the embodiment is built. This ID is composed of a PHS community number, a call area number, and a CS number. The following outlines each number.

The PHS community number defines a region over which a SYS-ID is effectively used in common across physically different PBXs.

The call area number defines an area over which broadcast calling is effective.

The CS number is a serial number identifying an individual CS in the call area.

In the database in a PBX, the PHS community number basically belonging to each mobile (or personal) station (PS) is stored. Each PBX can reference the database in another PBX via a digital leased line, called the fusion link 3. For the description of database cross reference and a communication path via the fusion link 3, refer to the Japanese Patent Application No. 09-011263 (now JPA-10-210156) given above.

Next, the operation of the embodiment according to the present invention will be described. In FIG. 1, a control CS-A 10 is a control CS-A connected to PBX-A1. Two private branch exchanges, PBX-A1 and PBX-B2, form a network based on the distributed node exchange network call control method (refer to Japanese Patent Application No. 09-011263, now JP-A-10-210156.) Each CS may be uniquely identified in PHS community A or in PHS community B with the call area number and the CS number. PBX-A1 and PBX-B2, connected via a digital leased line (a fusion link), may reference their databases with each other.

The PBX identification number of PBX-A1 and that of PBX-B2 are stored in the node database 6 and the node database 7, respectively, so that PBX-A1 and PBX-B2 may be identified by the PBX identification number A and the PBX identification B, respectively.

The call area number and the CS number of the control CS-A10 corresponding to PHS community A are stored in the network common database 4. The PBX identification number A, which uniquely identifies PBX-A1 to which the control CS-A10 belongs, is associated with the PHS community A and with the call area number and the CS number of each CS, and is stored in the network common database 4; while the PHS community number A, associated with the allocated location of the control CS-A10, is stored in the node database 6. The network common database 4 is copied to the network common database 5 of PBX-B2 at a regular interval to ensure that the network common database 4 and the network common database 5 are always identical.

When a general CS-B13 under control of (or allocated to) PBX-B2 is started, PBX-B2 attempts to read the SYS-ID corresponding to the PHS community A from the node database 7. When the node database 7 of PBX-B2 does not contain the SYS-ID corresponding to PHS community A, PBX-B2 searches its own network common database 5 for it. If the network common database 5 contains the SYS-ID corresponding to PHS community A, PBX-B2 reads it.

On the other hand, if the network common database 5 of PBX-B2 does not contain the SYS-ID corresponding to PHS community A, PBX-B2 reads the call area number and the CS number of control CS-A10 corresponding to PHS community A from network common database 5, and reads the PBX identification number A of control CS-A10 associated with PHS community A and with the call area number and CS number of the control CS-A10 from the network common database 5. Then, PBX-B2 reads from the node database 6 the SYS-ID (associated with PHS community A) of PBX-A1 specified by this PBX identification number A. When PBX-B2 gets the SYS-ID, PBX-B2 stores the SYS-ID as the SYS-ID corresponding to PHS community A into the node database 7. In addition, PBX-B2 stores the SYS-ID, which was read, into the general CS-B13 as the SYS-ID of the general CS-B13.

When the control CS-A10 under control of PBX-A1 is started, PBX-A1 reads the PHS community number associated with the allocated location of the control CS-A10 from the node database 6, determines that this is the number of the PHS community A, and, in association with PHS community A, writes the SYS-ID into the node database 6. The maintenance terminal copies the SYS-ID from the node database 6 to the network common database 4 as necessary.

The meritorious effects of the present invention are summarized as follows. As described above, the system call sign (SYS-ID) stored in a PBX having a control cell station may be read from another PBX. This makes it possible for a plurality of PBXs to have the same system call sign (SYS-ID) and for a mobile (private) station moving from one PBX to another to connect to the cell station sending the same system call sign (SYS-ID).

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. A private branch exchange network system comprising a network of plurality of private branch exchanges, each comprising a control cell station and communicating with at least one mobile station, (a) in which databases of the private branch exchanges may be cross-referenced, and
   (b) in which a control cell station allocated to each private branch exchange may be uniquely identified in each group with a call area number and a cell station number,
   (c) each of said private branch exchange comprising:
      (c1) a node unit database in which PBX identification information on said private branch exchange and group information associated with an allocated location of the control cell station are stored;
      (c2) a network common database in which the PBX identification information identifying the private branch exchange to which said control cell station is allocated is stored, said PBX identification being a associated with information on the group to which said control cell station belongs and with a call area number and a cell station (CS) number of each cell station; and
      (c3) means for copying the network common database to any of other private branch exchanges at a regular interval,
   (d) wherein a first private branch exchange to which said control cell station is allocated:
      (i) stores a system call sign of the group to which the control cell station belongs into the node database of the first private branch exchange,
      (ii) when a general cell station allocated to a second private branch exchange is started, said system call sign is read either from the data base of a second private branch exchange to which the general cell station is allocated or from the database of a private branch exchange to which the control cell station corresponding to the group of said general cell station belongs, and
      (iii) said system call sign is stored also in any general cell station belonging to the same group of said control cell station in a plurality of the private branch exchanges connected each other.

2. The private branch exchange as defined by claim 1, wherein, when the general cell station allocated to the second private branch exchange is started, said second private branch exchange:

(e) attempts to read the system call sign corresponding to the group of said general cell station from the node database of the second private branch exchange;
   (f) when said node database does not contain the system call sign corresponding to the group, attempts to read the system call sign corresponding to the group from the network common database;
   (g) when said network common database does not contain the system call sign corresponding to the group, gets the PBX identification information associated with the call area number and the CS number of the control cell station corresponding to said group from said network common database; and
   (h) reads the system call sign associated with said group from the node database of a (first) private branch exchange specified by said PBX identification information; and stores said read system call sign into the node database of this private branch exchange as the system call sign corresponding to said group; and
   (i) stores said system call sign into said general cell station as the system call sign of said general cell station.

3. The private branch exchange as defined by claim 2, wherein said private branch exchange has a PHS function, and wherein said group may be stored in the network common database as a group that identifies a PHS community.

4. The private branch exchange as defined by claim 1, wherein, when the control cell station is started, the private branch exchange to which said control cell station is allocated reads the group information associated with the allocated location of said control cell station from the node database thereof, writes the system call sign into said node database in association with said group information, and
   copies said system call sign from said node database thereof to said network common database.

5. The private branch exchange as defined by claim 4, wherein said private branch exchange has a PHS function, and wherein said group may be stored in the network common database as a group that identifies a PHS community.

6. The private branch exchange as defined by claim 1, wherein said private branch exchange has a PHS function, and wherein said group may be stored in the network common database as a group that identifies a PHS community.

* * * * *